United States Patent Office 3,245,804
Patented Apr. 12, 1966

3,245,804
PREPARING FLAVOR CONCENTRATES FROM HYDROLYZED FILTRATES OBTAINED FROM THE STEFFEN PROCESS AND PRODUCT
Erik V. Heegaard, Menlo Park, and Millice Floyd Hobbs, Monte Sereno, Calif., assignors to International Minerals & Chemical Corporation, a corporation of New York
No Drawing. Filed Sept. 15, 1961, Ser. No. 138,279
13 Claims. (Cl. 99—140)

This invention relates to flavor concentrates adapted to enhance the flavor of food products. More particularly, this invention relates to flavor concentrates produced from hydrolyzed filtrates obtained from the Steffen process of sugar beet refining.

In the manufacture of beet sugar, water soluble constituents of the sugar beets are elached out and the extract is concentrated to recover the sugar. In the method known as the Steffen process the extract is diluted with water and a slurry of hydrated lime is added whereby the sucrose is precipitated as calcium saccharates which are removed by filtration. The filtrate, known as dilute Steffen filtrate, may be carbonated with $CO_2$ to remove residual lime and concentrated to about 60% solids content. This material is known in the sugar beet industry as Concentrated Steffen Filtrate (abbreviated to CSF) and serves as a convenient raw material for the recovery of glutamic acid. Steffen filtrate contains varying amount of glutamic acid as well as substances such as glutamic acid anhydride, pyrrolidonecarboxylic acid, and the like, which are potential sources of glutamic acid. The filtrate containing the glutamic acid mother substances is hydrolyzed and the glutamic acid is recovered from the hydrolyzate by crystallization at its isoelectric point; that is, a pH of about 2.5 to about 4.0 and preferably between about 3.1 and about 3.3.

The mother liquor from crude glutamic acid crystallization, viz., the liquors produced by hydrolyzing glutamic acid mother substances in Steffen filtrate and from which at least a portion of glutamic acid has been removed, has found an economic outlet as a supplement for animal feeds. Such utilization is described, inter alia, in Gillis Reissue Patent 24,707. As indicated therein, the unneutralized end liquor may be added to animal rations in amounts between about 0.1% and about 25% by weight of the feed.

While the processing of the sugar beets to obtain sugar by the Steffen process and the subsequent processing of Steffen filtrates to obtain glutamic acid in all respects conform to approved standards of processing food for human consumption, the hydrolyzed filtrates both before and after processing to remove glutamic acid exhibit flavor and odor characteristics which have precluded their use for human consumption. Since both the hydrolyzed Steffen filtrate and the mother liquor following crude glutamic acid crystallization contain, in addition to glutamic acid, valuable materials such as amino acids, including aspartic acid, alanine, valine, methionine and leucine; betaine; and other organic acids, including lactic acid, Steffen filtrates and glutamic acid mother liquors obtained therefrom constitute an attractive nutritional source. Because of the flavor and odor characteristics, however, these materials have not found an outlet as a nutritional supplement for human consumption.

Accordingly, it is a primary object of this invention to provide a flavor concentrate excellently suited for human consumption containing the major portion of the water-soluble, non-sugar constituents of sugar beets.

It is a further object of this invention to provide a flavor concentrate from hydrolyzed Steffen filtrate or glutamic acid mother liquor obtained therefrom which may be employed to enhance the existing flavor of food products.

It is a still further object of this invention to provide a flavor concentrate obtained from Steffen filtrate or glutamic acid mother liquor obtained therefrom which may be employed to add desirable flavor to fod prducts.

It is an additional object of this invention to provide a flavor base from Steffen filtrate or glutamic acid mother liquor obtained therefrom which may be employed to enhance both the color and flavor of food products.

It is another object of this invention to provide a method of treating Steffen filtrate or glutamic acid mother liquor obtained therefrom to obtain a flavor concentrate characterized by a pleasing taste and a pleasing odor.

In accordance with this invention, hydrolyzed Steffen filtrate or glutamic acid mother liquor obtained therefrom is treated with a solid adsorbent to remove generally from about 2% to about 40% of the dry substance of the filtrate and at least about 20% of the color materials to provide after removal of inorganics a brown-colored flavor concentrate for human consumption characterized by a desirable odor and flavor.

The invention also embraces the flavor concentrates produced by the above method.

The concentrates of this invention are characterized by a broth-like taste and a pleasing caramel-like color. The flavor concentrates have many characteristics of highly concentrated vegetable broths, are nutritionally valuable, and generally are characterized by a flavor which is quite reminiscent of an extract of beef. Consequently, in additin to increasing the existing flavor appeal of foods, the flavor concentrates increase substantially the flavor and color of such foods as meat sauces, gravies, soups, ground meat casseroles, and the like.

Hydrolyzed Steffen filtrate and glutamic acid mother liquor derived therefrom constitute the starting materials for the practice of this invention. Such materials will contain the major portion of water-soluble non-sugar constituents of the sugar beets and in addition contain minor proportions of carbohydrate materials which are not precipitated or removed in the Steffen process. It will be apparent that the precise compositions of these materials will vary depending upon the nature of the sugar beets and the process conditions employed.

Typical glutamic acid mother liquors will contain from about 18% to about 28% crude protein, of which between about 10% and about 15% is betaine. A typical analysis of mother liquor is as follows:

Total solids (by refractometer) _____ 62.0% min.
Moisture _____ 38.0% max.
Crude protein _____ 18–28%.
Crude fat _____ ____
Crude fibre _____ ____
Ash _____ 12.5% max.
Chloride (calculated as NaCl) _____ 8.0% max.
Nitrogen-free extract _____ 23.5% min.
Betaine hydrochloride, mgs./lb. _____ 70,000.
pH _____ 3.1–3.3.
Pounds per gallon _____ 10.6.

Crude protein is calculated in the above analysis based upon nitrogen content. Crude protein weight equals 6.25 times the weight of the nitrogen.

While either hydrolyzed Steffen filtrate or glutamic acid mother liquor may be processed separately, this invention also embraces the processing of mixtures of these materials. Generally, equivalent monosodium glutamate concentrations in excess of about 10% tend to cause crystals to form in the flavor concentrate and therefore are not preferred if a liquid product is desired. Accordingly, if the glutamic acid content of a particular starting material is high, the material most appropriately may be blended with other starting materials having a lower glutamic acid content to provide an equivalent monosodium glutamate concentration of 10% or less in the final liquid concentrate. It will be apparent that the glutamic acid content of a mother liquor or other starting material having a low glutamic acid content may be increased, if desired, by blending the material with, for example, an intermediate stream from a monosodium glutamate production process or by adding glutamic acid thereto.

Hydrolysis of the starting material may be accomplished by any of the methods well known to the art. For example, the filtrate may be adjusted to a pH above about 12 with an alkaline material such as sodium hydroxide, potassium hydroxide, or the like. Alternatively, the filtrate may be adjusted to a pH of less than about 1 with a strong mineral acid such as sulfuric acid, hydrochloric acid, or the like. Following pH adjustment, the material is heated to effect hydrolysis. The particular means employed for hydrolysis is not critical to the practice of this invention.

The pH of the filtrate during processing does not appear to be critical. In a preferred embodiment of the invention, however, the pH of the filtrate is maintained below about pH 7.

In the event that the hydrolyzed filtrate contains colloidal impurities, such impurities desirably should be removed before the feed is processed further. For example, glutamic acid mother liquor is characterized by a pH of from about 2.5 to about 4 and generally from about 3.1 to about 3.3 and it is desirable to remove the colloidal impurities which form in this pH range. These impurities may be removed by permitting diluted mother liquor to stand so that the impurities flocculate and thereafter filtering the end suspension. Filter aids most appropriately may be employed to aid in the removal of the colloidal impurities but the particular means employed to remove the colloidal impurities are not critical.

In order that the flavor concentrate may be prepared readily, it is often desirable that the feed be diluted with water. The extent of dilution is a matter of choice, depending upon the particular feed and method employed. It has been found, however, that dilution to provide a dry solids content of from about 15% to about 40% is most appropriate.

The diluted feed then is treated with a solid adsorbent generally to remove from about 2% to about 40% of the dry solids and at least about 20% of the color. The exact nature of the materials which are responsible for the objectionable odor and flavor of the starting material has not been fully determined. It appears, however, that these materials include color bodies, organic acids, and other colorless dry solids. From the investigations which have been conducted, it appears that at least about 50% of the undesirable materials are cationic in nature.

It is difficult to establish for all cases the precise amount of solids and color bodies that are removed. The extent of removal, however, can readily be determined by taste and odor tests of the finished concentrates.

The solid adsorbents which may be employed for the practice of this invention are adsorbents well known to the art and include, inter alia, granular carbon, clay, adsorbent resins, zeolites, and ion exchange resins.

The granular carbon adsorbent which is employed in the practice of this invention is well known to the art and is commercially available from a variety of sources. Since this material is well known and is readily available, it will not further be described here. Similarly, the clays which may be employed are well known to the art.

The adsorbent resins contemplated for use in the process of this invention also are known to the art. Such resins are porous and possess a large active surface which exhibits adsorptive capacity for complex organic bodies. Thus, the resins may contain, for example, a phenolic matrix with mixed polar groups. Such resins may exhibit minor ion exchange characteristics but they function primarily as adsorbents. Adsorbent resins generally are available in granular form and may include, inter alia, amine-aldehyde condensation products.

The ion exchange resins which may be employed in the present invention generically include both cation exchange resins and anion exchange resins as well as resins which exhibit both cation and anion exchange properties. Typical anion exchange resins include those resins containing quaternary ammonium or amine groups. Such resins are well known to the art and are described, inter alia, in U.S. Patents 2,341,907; 2,366,008; 2,567,836; 2,614,009; 2,632,000, 2,700,672; and 2,753,279. Typical cation exchange resins contain sulfonic acid groups, phenolic hydroxyl groups and the like. Such resins, also well known to the art, are described, inter alia, in U.S. Patents 2,228,159; 2,366,007; and 2,687,383. Typical cation-anion exchange resins, also known to the art, will contain both anion exchange and cation exchange groups as described above and are discussed, inter alia, in U.S. Patent 2,586,883. Instead of employing a cation-anion exchange resin, the filtrate first may be passed through one type resin and then may be passed through the other type. The invention generically contemplates the utilization of ion exchange resins to treat the above-identified filtrates.

Inorganic ion exchange materials such as zeolites also may be employed and will function in a manner similar to the above-described ion exchange resins.

All of the above types of adsorbents are operable to produce flavor concentrates, but granulated carbon and adsorbent resins are particularly preferred for the practice of this invention. These adsorbents appear to provide the most desirable well-rounded flavor in the final concentrate and are more specific in removing only the undesirable constituents of the hydrolyzed starting materials.

The filtrates may be treated with an adsorbent in either a continuous or a batch process. In the batch process the adsorbent is admixed with the filtrate and the two materials are permitted to remain in contact for a period sufficient to permit the adsorbent to remove the required amount of dry solids and color bodies. Alternatively, the adsorbent may be placed in one or more columns, either in parallel or in series, and the diluted filtrate passed through the column. It will be apparent that the total amount of adsorbent employed will be dependent upon the process conditions established. For high flow rates or shorter batch contact times, greater amounts of adsorbent will be required to remove the desired portion of dry substance and color bodies. Conversely, lower flow rates or longer batch contact times will permit the use of less adsorbent. The determination of practical flow rates or batch contact time and corresponding adsorbent bed sizes readily may be accomplished for each particular raw material by the use of a trained taste panel, which evaluates samples.

Following the removal of the undesirable constituents of the starting material, the diluted material, if necessary, most appropriately is adjusted to provide a pH of the concentrate of from about 5 to about 7 and preferably about 6.5 with an alkaline sodium compound such as sodium hydroxide and then is concentrated to a dry solids content from about 60% to about 75%. Since inorganic crystalline materials which may be present such as sodium chloride and sodium sulfate tend to crystallize from the concentrated liquor, these are filtrated from the concentrated liquor employing any of the standard filtering methods known to the art.

The above concentration may be effected by heating in a vacuum vessel at about 60° C. to about 80° C. Total time of concentration often is less than one hour.

The concentrated liquor from which the inorganic crystalline materials have been removed constitutes one of the preferred flavor concentrates of this invention. By maintaining the dry solids content of the concentrate within the above limits, a liquid material is obtained which readily may be handled yet the concentrates contain a minimum of water and consequently are characterized by a reduced bulk volume. It will be apparent that the concentration of the flavor concentrate is not critical and if desired the concentrate may have any dry solids content, or, conversely, may be dried to a totally dry state.

The preferred flavor concentrates of this invention are produced by contacting the filtrates with carbon or with an adsorbent resin to remove from about 2% to about 40% of the dry substance and to remove from about 20% to about 99% of the color bodies. These concentrates are characterized by an excellent vegetable broth-like taste and a pleasing caramel-like color.

As indicated earlier, base hydrolysis can be effected with any of a variety of known basic materials. Similarly, adjustment of pH to provide the preferred pH in the final concentrate can be effected with any of a variety of inorganic basic materials. In the preferred embodiment of the invention, however, these operations are carried out employing sodium hydroxide so that the final flavor concentrate will contain monosodium glutamate and, therefore, exhibit flavor enhancing properties.

As noted earlier, the precise composition of the flavor concentrate will vary depending upon the particular filtrates and process conditions established. A typical flavor concentrate, however, may analyze as follows:

| Component: | Percent composition |
| --- | --- |
| Total solids | 67.8 |
| Ash content | 20.0 |
| Total nitrogen | 5.4 |
| Amino nitrogen | 1.2 |
| Nitrogen-free extract | 33.5 |
| Monosodium glutamate | 9.4 |
| Betaine | 21.0 |
| Chloride (as NaCl) | 6.5 |
| Sodium | 8.5 |
| Sulfate | 0.3 |
| Calcium | 0.08 |
| Magnesium | 0.07 |
| Potassium | 1.90 |
| Iron | 0.03 | pH, 6.2.

The development of the desirable "beefy" taste and odor appears to occur because of reactions invoking flavor precursors during the later stages of the concentration of the adsorbent effluent. While the invention contemplates flavor concentrates having the taste which is developed during evaporation, if desired the concentrates further may be subjected to a mild heat treatment of from about 60° C. to about 90° C. and preferably from about 70° C. to about 85° C. The time of treatment may vary widely and may last from about ½ to about 24 hours or more. Either atmospheric pressure or vacuum conditions may be employed. Care must be exercised both in evaporation and in later heat treatment to avoid excessive temperatures or excessive time of treatment since either may cause the development of an undesirable burnt taste.

The following examples are included in order more fully to demonstrate the practice of this invention. These examples are included for ilustrative purposes only and in no way are intended to limit the scope of this invention.

EXAMPLE I

General procedure

Flavor concentrates were prepared from mother liquors from crude glutamic acid crystallization, viz., the liquors produced by hydrolyzing glutamic acid mother substances in Steffen filtrate and from which a portion of glutamic acid has been removed, according to the following procedure.

The mother liquor was polished by diluting 1:1 with water and allowing to stand for at least two hours to permit colloidal impurities to flocculate. A diatomaceous silica filter aid (Hyflo, Johns-Manville Sales Corporation) was added to the liquid and the solids were removed by passing the liquor through a filter. The liquor then was directly used for feed.

A 10 cm. diameter column 137 cm. in length was employed as the adsorbent column.

The column was operated with gravity flow at a feed rate of 80–90 ml./min. The effluent was collected and adjusted to pH 6–7 with sodim hydroxide, and subsequently evaporated under reduced pressure to a 71–72% dry solids content in the liquid phase. The concentrated material was cooled and the precipitate removed by filtration. The resulting filtrate was diluted with water to a dry solids content of 70%.

For each of the subsequently described examples of adsorbents and procedures, a series of experiments was carried out varying the amount of column feed treated. In each case the effluent was treated as described above and the resulting flavor concentrates were tested organoleptically by several people. In this way the operating procedure which results in the most desirable flavor properties was selected. These are now described in the following examples.

Flavor concentrate preparation

A flavor concentrate was prepared in accordance with the above method, employing granular carbon as the adsorbent. The dry granular carbon (Pittsburgh Type CAL, Pittsburgh Coke & Chemical Company) was slurried with water and the mixture adjusted to pH 3.2 with acid, and transferred to a column. The bed depth in the column was 92 cm. and to it was fed polished diluted mother liquor until 5.27 kg. of effluent had been collected. The granular carbon retained 38% of the dry solids and 99% of the color present in the feed. From this effluent was now prepared a sample of flavor concentrate by adjusting it to pH 6.5 with sodium hydroxide, evaporating in vacuum, removing precipitate by filtration, and diluting the resulting filtrate to 70% dry solids with water.

Organoleptic examination of the product indicated it to be of satisfactory flavor quality for its intended purpose.

The product had the following composition:

| | Percent |
| --- | --- |
| Dry solids | 69.8 |
| MSG | 2.96 |
| NaCl | 8.31 |
| $Na_2SO_4$ | 1.81 | pH (25% dry solids), 5.7.

EXAMPLE II

The process of Example I was repeated, except that a granular adsorbent resin having a phenolic matrix with mixed polar groups (Duolite S–30, Chemical Process Company) was substituted for the granular carbon. The resin was soaked in water to permit the material to swell to its full volume and then was added to the column. The resin was regenerated employing 7.5 liters of 4% sodium hydroxide solution. After washing the column with several volumes of tap water it was finally washed with 6 liters of 0.5% $H_2SO_4$ solution. After back-washing and settling the column bed was 97 cm. in depth.

Polished, diluted mother liquor was fed to the column at a rate of 81 ml./min. until 13.05 kg. of effluent was obtained. In this case 12% of the dry solids and 95% of the color were removed from the feed. After adjusting the effluent to pH 6.5 and evaporating in vacuum to 71–72% liquid phase dry solids, the concentrate was cooled and filtered. The filtrate was diluted with water to 70% dry solids content.

The product had the following composition:

| | Percent |
|---|---|
| Dry solids | 70.2 |
| MSG | 2.85 |
| NaCl | 6.46 |
| $Na_2SO_4$ | 0.43 | pH (25% dry solids), 5.6.

EXAMPLE III

The process of Example I was repeated employing cation exchange resin having a highly expanded phenolic matrix and methylene sulfonic acid functional groups (Duolite C–10 cation exchanger, Chemical Process Company) in place of the activated carbon. The resin was presoaked in 5% hydrochloric acid solution to permit it to swell to its full volume before being transferred to the column. The resin was then converted to the sodium state by washing with 10 liters of 4% sodium hydroxide solution. The residual caustic was removed by washing the resin and finally by back-washing the resin. The settled depth of the regenerated resin was 119 cm.

The column was fed with polished diluted mother liquor at a rate of 90 ml./min. until 11.75 kg. of effluent had been collected. This was subsequently adjusted to pH 6.5 with sodium hydroxide and concentrated under reduced pressure to 71–72% solids. The precipitated solids were removed and the resulting flavor concentrate had the following composition:

| | Percent |
|---|---|
| Dry solids | 68.8 |
| MSG | 2.6 |
| NaCl | 6.53 |
| $Na_2SO_4$ | 0.59 | pH (25% dry solids), 5.8.

In this case 7% of the solids and 52% of the color of the feed were removed by the ion exchanger.

Organoleptic test indicated that the flavor concentrate had a desirable odor or taste making it suitable for adding to soups, gravies, and other food products.

EXAMPLE IV

The process of Example I was repeated except that the granulated carbon was replaced with an anion exchange resin having a high porous hydrocarbon matrix and quaternary ammonium functional groups (Duolite A–101 anion exchange resin, Chemical Process Company).

After presoaking the resin and placing it in the column it was exhausted with a 4% sodium hydroxide solution and then regenerated with 4% hydrochloric acid solution. The settled resin bed was 52 cm. in depth.

Polished diluted mother liquor was fed to the column at a rate of 58 ml./min. The effluent was collected until 11.2 kilos were obtained and the combined effluent was then further processed as in the previous examples.

The sample of flavor concentrate prepared by using A–101 anion resin had a broth-like flavor and the following composition:

| | Percent |
|---|---|
| Dry solids | 69.0 |
| MSG | 2.6 |
| NaCl | 8.9 |
| $Na_2SO_4$ | 0.5 | pH (25% dry solids), 5.8.

The resin removed 5% of the dry solids and 20% of the color present in the feed.

EXAMPLE V

Flavor concentrates were prepared from mixtures of hydrolyzed Steffen filtrate and crude glutamic acid mother liquor according to the following procedure.

Two columns 4.7 cm. in diameter and about 150 cm. in length were partially filled with an adsorbent resin having a phenolic matrix and mixed polar groups (Duolite S–30 resinous adsorbent, Chemical Process Company). The resin was regenerated prior to use with a 4% caustic solution. The total bed depth of columns when run in series was 170 cm.

The feed was prepared from a 1000 parts of hydrolyzed Steffen filtrate and 245 parts of glutamic acid mother liquor. These proportions were employed in an attempt to provide a final flavor concentrate having a monosodium glutamate content of 10%. The mixture was diluted with water to a dry solids content of 20%, and then adjusted to pH 5.0 with hydrochloric acid, while maintaining the temperature below 40° C.

The adjusted material was fed to the columns using an average flow rate of 73 ml./min., and the effluent collected until 14.15 kg. were obtained. This material was evaporated under reduced pressure to a 68–69% dry solids in the liquid phase and allowed to cool, after which the precipitated crystals of inorganic salts were removed by filtration. The filtrate was then adjusted to pH 6.5 with caustic soda.

This treatment removed 6.8% of the dry solids and 76% of the color present in the column feed.

The resulting flavor concentrate had a broth-like flavor and the following composition:

| | Percent |
|---|---|
| Dry solids | 68.7 |
| MSG | 11.0 |
| NaCl | 7.4 |
| $Na_2SO_4$ | 0.2 |
| Ash | 21.7 | pH, 6.5.

EXAMPLE VI

Mother liquor from crude GA crystallization from alkaline hydrolyzed concentrated Steffen filtrate was processed with a resinous, adsorbent resin having a phenolic matrix with polar groups (Duolite S–30, Chemical Process Company) to provide 10,000 lbs. of flavor concentrate. The process was operated on a continuous basis to allow recovery of all flavor values by recycling diluted material back into the main process flow.

Glutamic acid mother liquor was diluted to 32% dry solids with wash water effluent from an exhausted resinous bed, and held for 4 hours to flocculate colloidal impurities, which subsequently were removed by filtration. The filtrate was percolated through the S–30 resinous adsorbent bed, and the effluent collected, after first sewering effluent (1.2% D.S.) corresponding to 1.25 bed volume of the resinous adsorbent. The collection of effluent was continued until a total of 2.7 bed volumes had been obtained. The dry solids content of the effluent composite varied within the limits 23.8% ±1.5% from batch to batch. This composite effluent was then adjusted to pH 6.4 with strong caustic solution, combined with recycles from the previous inorganic separations, and evaporated in vacuum to a dry solids content of 72–74%. The average temperature during the evaporation was 75° C., the vacuum being 27 inches of mercury. The rate of evaporation corresponded to about 8 lbs. of condensate per minute. The inorganics in the hot evaporator discharge (68° C., average) was removed on a 20-inch basket centrifuge (1400 r.p.m.).

The inorganic filtrate was allowed to cool in a holding tank where additional separation of solids occurred. After several days the clear supernatant liquor was drained off, and the sludge on the bottom recycled to the inorganic separation steps. The decanted supernatant liquor from the holding tank was diluted with water to 65% dry solids and packaged.

One ton of this product required 1560 lbs. of end liquor solids and 575 lbs. of caustic soda (50%) for its production.

EXAMPLE VII

Mother liquor from crude glutamic acid was diluted to about 32% dry solids and filtered to remove colloidal impurities which had flocculated. The polished liquor was slurried with the resinous adsorbent having a phenolic matrix and mixed polar groups (Duolite S–30, Chemical Process Company) in the ratio of 1.5 volume of feed to one volume of wet resin. This mixture was left for 16 hours before filtering. The filtrate was adjusted to pH 6.5 and then evaporated under reduced pressure to 68–70% dry solids. After cooling and filtering the concentrate a sample of flavor concentrate was obtained with a broth-like flavor.

Analysis showed that 87% of the color and 11% of the dry solids in the feed were removed by this treatment.

The sample analyzed as follows:

| | Percent |
|---|---|
| Dry solids | 68.1 |
| MSG | 2.85 |
| NaCl | 7.7 |
| $Na_2SO_4$ | 0.6 |
| Ash | 19.9 | pH, 6.4.

EXAMPLE VIII

The mother liquor from crude glutamic acid was treated as in the previous example. To one weight of filtrate was added 0.4 weight of granular activated carbon (Pittsburgh Type CAL, Pittsburgh Coke & Chemical Company). After standing for 16 hours it was filtered and the filtrate adjusted, concentrated, and filtered as in the other examples to produce an acceptable flavor base.

EXAMPLE IX

Example VIII was repeated except that 48% by weight on feed of powdered carbon (Darco S–51, Altas Powder Company, Chemical Division). The filtrate was treated as in the previous examples and found to produce a sample of flavor concentrate of acceptable flavor.

EXAMPLE X

Flavor concentrates as described in Examples I–IX may be used for preparing bouillon cubes useful in preparation of soups and gravies, etc.

The flavor concentrate is evaporated under reduced pressure to a dry solids content of 93–94%. Salt, monosodium glutamate, and hydrogenated vegetable fat are mixed in, and the resulting composition cast to cubes and wrapped in foil.

A suitable composition is:

| | Parts |
|---|---|
| Flavor concentrate (93–94% dry solids) | 200 |
| NaCl | 146 |
| MSG | 20 |
| Hydrogenated vegetable fat | 40 |

Since modifications will be apparent to one skilled in the art, it is intended that this invention be limited only by the scope of the appended claims.

We claim:

1. A process for producing a flavor concentrate which comprises (1) contacting a starting filtrate having a dry solids content below about 40% by weight selected from the group consisting of hydrolyzed Steffen filtrate, glutamic acid mother liquor obtained from hydroylzed Steffen filtrate, and mixtures thereof, with a solid adsorbent selected from the group consisting of carbon, clays, inorganic ion-exchange materials, and organic resins having an ability to adsorb color materials and remove objectionable odor and flavor from said starting filtrate to remove from about 2 to about 40% by weight of the dry solids and at least about 20% by weight of the color materials initially present in said starting filtrate and thereby provide a resultant adsorbent effluent liquor essentially free of objectionable odor and flavor; (2) concentrating said adsorbent effluent liquor at a pH in the range of from about 5 to about 7; (3) at least during the latter stages of concentrating said adsorbent effluent liquor in step (2), heating the resultant concentrated effluent liquor at a temperature in the range of from about 60° to about 90° C. to develop therein improved flavor characteristics and thereby provide a brown-colored concentrate liquor; and (4) recovering from said brown-colored concentrate liquid at least the solids mixture dissolved therein to provide said flavor concentrate for incorporation into a food product adapted for human consumption to enhance the flavor thereof.

2. The process according to claim 1 wherein in said recovery step (4) said solids mixture dissolved in said brown-colored concentrate liquor is recovered as a substantially dry flavor concentrate product.

3. The process according to claim 1 wherein said solid adsorbent is activated carbon.

4. The process according to claim 1 wherein said solid adsorbent is an organic resin having a porous matrix.

5. The process according to claim 1 wherein said starting filtrate has a dry solids content in the range of from about 15 to about 40% by weight, said concentrating step is carried out by heating said adsorbent effluent liquor under vacuum at a temperature of from about 60° to about 80° C., and said brown-colored concentrate liquor is characterized by a dry solids content in the range of from about 60 to about 75% by weight.

6. The process according to claim 5 wherein said starting filtrate is a mixture of hydrolyzed Steffen filtrate and glutamic acid end liquor obtained from hydrolyzed Steffen filtrate.

7. The process according to claim 5 wherein said starting filtrate is hydrolyzed Steffen filtrate.

8. The process according to claim 7 wherein said solid adsorbent is activated carbon.

9. The process according to claim 7 wherein said solid adsorbent is an organic resin having a porous matrix.

10. A flavor concentrate prepared in accordance with the method of claim 1.

11. The process for producing a flavor concentrate suitable for human consumption and having a desirable odor and flavor which comprises (1) diluting glutamic acid mother liquor obtained from hydrolyzed concentrated Steffen filtrate to a dry solids content of from about 15% to about 40%; (2) filtering said diluted liquor to remove colloidal materials; (3) contacting said filtered glutamic acid mother liquor with a solid adsorbent selected from the group consisting of carbon, clays, inorganic ion-exchange materials, and organic resins having an ability to adsorb color materials and to remove objectionable odor and flavor from said filtered mother liquor to remove from about 2% to about 40% of the dry solids and at least about 20% of the color materials initially present in said filtered mother liquor and thereby provide an adsorbent effluent liquor essentially free of objectionable odor and flavor; (4) adjusting the pH of said adsorbent effluent liquor with an alkaline sodium compound to a value of from about 5 to about 7; and (5) heating the resultant liquor under vacuum at a temperature from about 60° C. to about 80° C. to provide a flavor concentrate characterized by a dry solids content from about 60% to about 75%.

12. The process of claim 11 wherein the adsorbent is activated carbon.

13. The process of claim 11 wherein the adsorbent is an organic resin having a porous matrix.

References Cited by the Examiner

UNITED STATES PATENTS

| | | | |
|---|---|---|---|
| 1,992,462 | 2/1935 | Barnett | 99—16 X |
| 2,180,637 | 11/1939 | Kemmerer. | |
| 2,375,164 | 5/1945 | Bennett | 260—527 |
| 2,375,165 | 5/1945 | Nees et al. | 260—527 |
| 2,487,785 | 11/1949 | Blish | 260—527 |
| 2,535,117 | 12/1950 | Bennett | 260—527 |
| 2,723,292 | 11/1955 | Schlaeger et al. | 260—527 |
| 2,937,199 | 5/1960 | Donahue | 260—529 |
| 2,946,686 | 7/1960 | Gaver | 99—16 |

A. LOUIS MONACELL, *Primary Examiner.*

BEATICE H. STRIZAK, *Examiner.*

UNITED STATES PATENT OFFICE
CERTIFICATE OF CORRECTION

Patent No. 3,245,804                                April 12, 1966

Erik V. Heegaard et al.

It is hereby certified that error appears in the above numbered patent requiring correction and that the said Letters Patent should read as corrected below.

Column 1, line 17, for "elached" read -- leached --; column 2, line 11, for "fod" read -- food --; column 5, line 1, for "filtrated" read -- filtered --; line 55, for "pH, 6.2." read -- pH -------6.2 --; column 6, line 23, for "sodim" read -- sodium --; line 35, for "results" read -- resulted --; line 64, for "pH (25% dry solids), 5.7." read -- pH (25% dry solids)------5.7 --; column 7, line 18, for "pH (25% dry solids), 5.6." read -- pH (25% dry solids)--------5.6 --; line 45, for "pH (25% dry solids), 5.8." read -- pH (25% dry solids)----------5.8 --; line 55, for "high" read -- highly --; same column 7, line 75, for "pH (25% dry solids), 5.8." read -- pH (25% dry solids) ----------5.8 --; column 8, line 41, for "pH, 6.5." read -- pH--------6.5 --; column 9, line 32, for "pH, 6.4." read -- pH---------6.4 --.

Signed and sealed this 1st day of August 1967.

(SEAL)
Attest:

EDWARD M. FLETCHER, JR.                            EDWARD J. BRENNER
Attesting Officer                                      Commissioner of Patents